Nov. 1, 1960  R. R. LAWSON  2,958,174
BROOM HEAD HARVESTING MACHINE
Filed Sept. 6, 1957  4 Sheets-Sheet 1
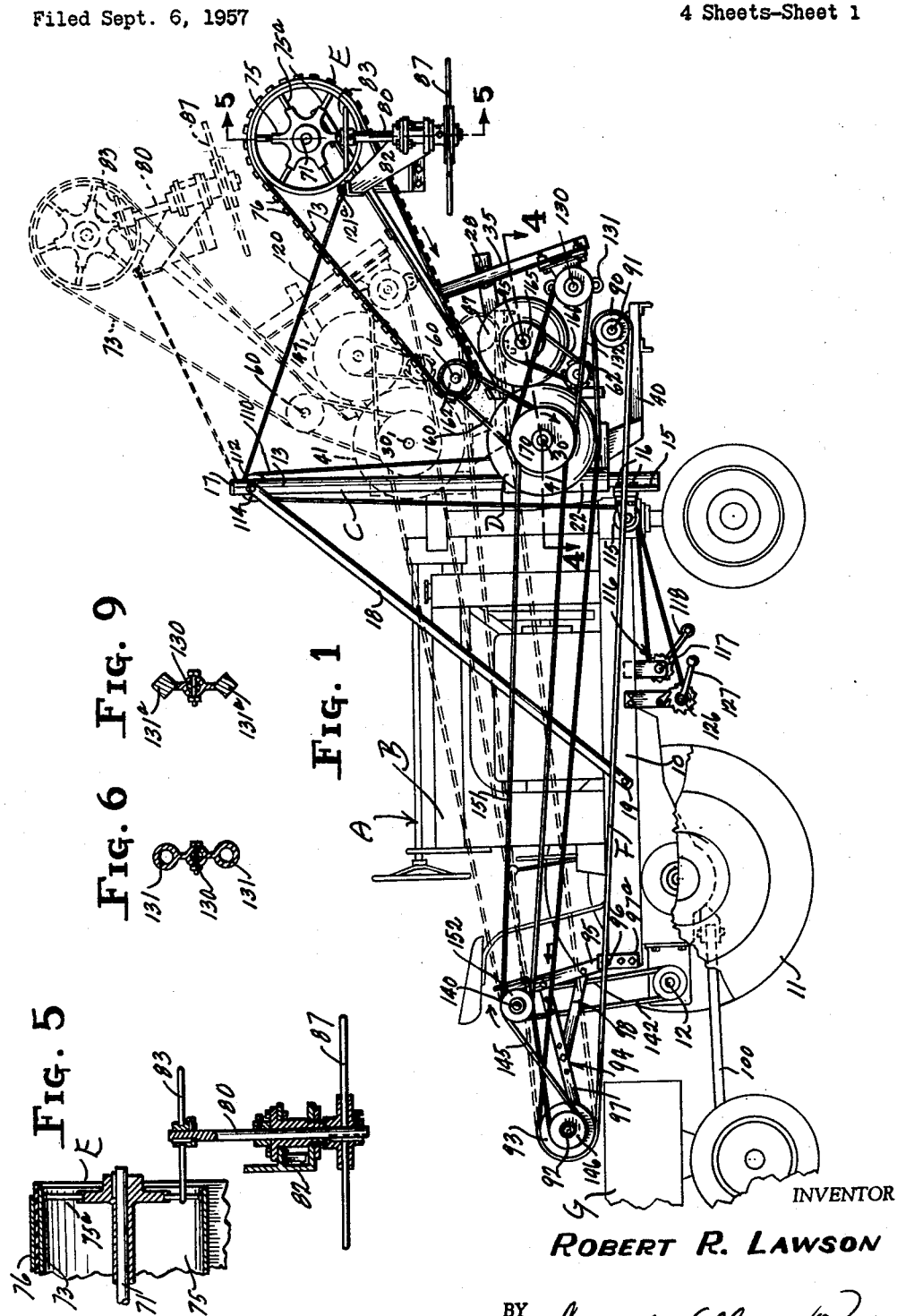
INVENTOR
ROBERT R. LAWSON
BY Lancaster, Allwine & Rommel
ATTORNEYS

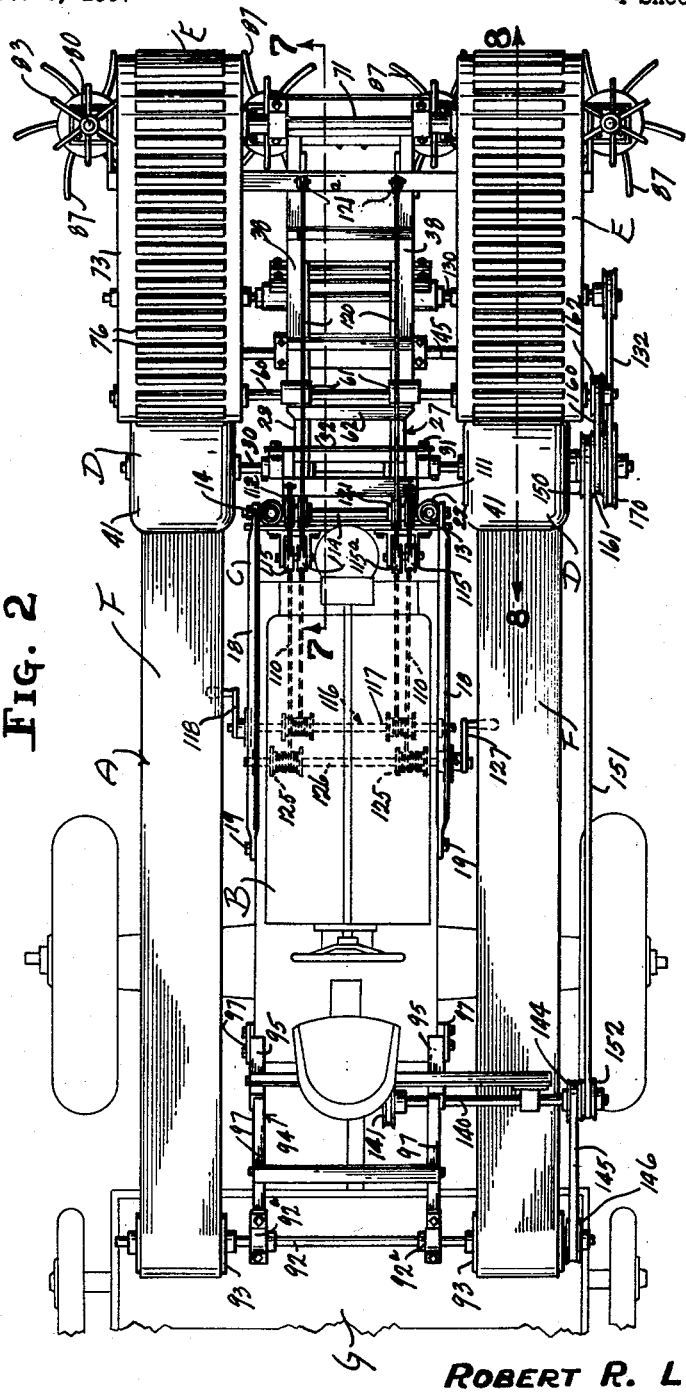

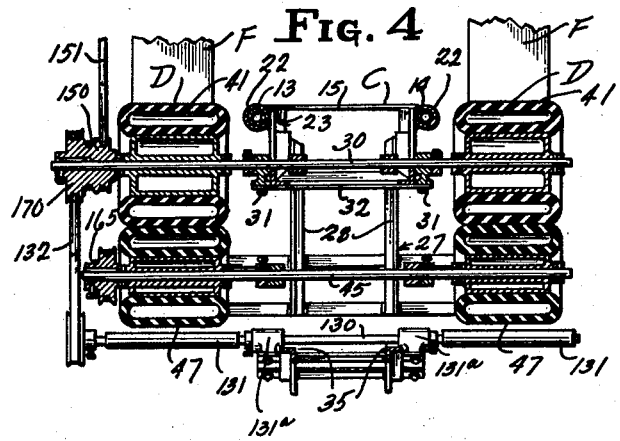
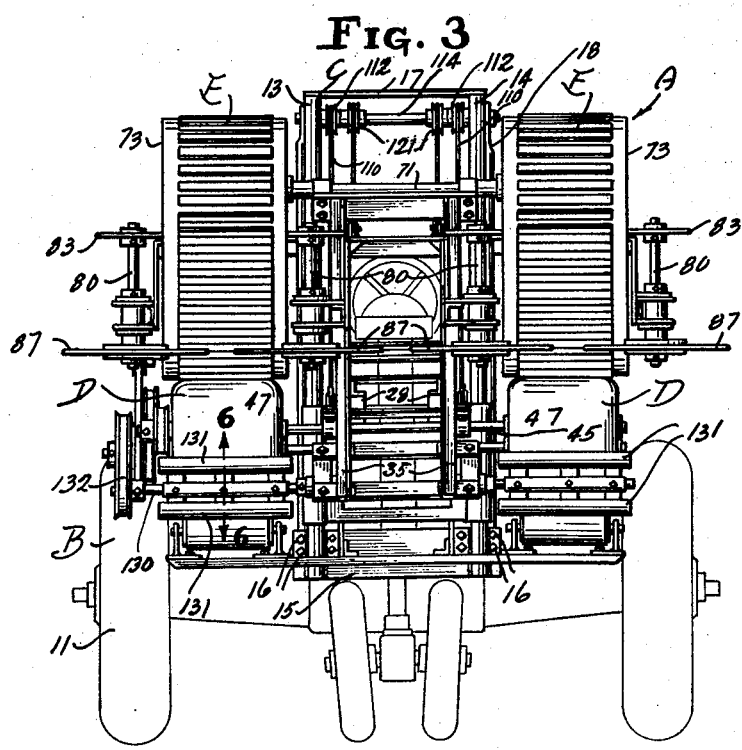

Nov. 1, 1960 R. R. LAWSON 2,958,174
BROOM HEAD HARVESTING MACHINE
Filed Sept. 6, 1957 4 Sheets-Sheet 4

INVENTOR
ROBERT R. LAWSON
BY
ATTORNEYS

United States Patent Office 2,958,174
Patented Nov. 1, 1960

2,958,174

BROOM HEAD HARVESTING MACHINE

Robert R. Lawson, Rte. 1, Box 40, Beeville, Tex.

Filed Sept. 6, 1957, Ser. No. 682,430

6 Claims. (Cl. 56—15)

This invention relates to improvements in broom corn harvesting machines.

Known efforts to produce broom corn picking machines have for the most part been unsatisfactory. It is therefore a primary object of the present invention to provide a broom corn harvesting machine with effective means to harvest a plurality of rows of corn at the same time by means which will guide and control the stalk and broom head and successfully pull the broom head out of the sheath or boot and convey it to a suitable location, such as a trailer.

It is a further object of this invention to provide a broom corn harvesting machine or picker adapted to serve as an attachment for power operated tractors; the same having improved means for attachment to the front of a tractor. The picker includes broom corn stalk and top manipulating parts, all of which may be driven from the power take-off of the tractor.

A further object of this invention is the provision of an improved broom corn harvesting machine having broom corn stalk and top controlling parts and means for pulling the broom head from the sheath or boot of the stalk and handling and disposing of the heads without injury thereto.

A further object of this invention is the provision of an improved broom corn harvesting machine with adjustable features enabling the same to pick broom heads from their boots or sheaths for different height sizes of broom corn.

Other objects and advantages of this invention will be apparent during the course of the following detailed description.

In the accompanying drawings, forming a part of this specification, and wherein similar reference characters designate corresponding parts throughout the several views:

Figure 1 is a side elevation showing the improved broom corn harvesting attachment connected to a conventional power actuated tractor (which has certain parts broken away for clarification); the parts of the attachment being shown in position for broom corn harvesting; the view showing the manner in which the parts of the attachment are adjustable for enabling broom corn of various height sizes to be harvested.

Figure 2 is a plan view of the broom corn picker and tractor as shown in full lines in Figure 1 of the drawings.

Figure 3 is a front end view of the broom corn picker attachment and tractor upon which it is mounted.

Figure 4 is a cross sectional view taken substantially on the line 4—4 of Figure 1, through means provided upon the attachment for pulling the broom corn heads from their sheaths or boots.

Figure 5 is a vertical cross sectional enlarged view taken substantially on the line 5—5 of Figure 1 showing means for straightening the broom corn as it stands in a row in order that it will be properly guided into the broom head picker attachment.

Figure 6 is a cross sectional view taken substantially on the line 6—6 of Figure 3 showing more particularly a stalk bumper which aids in severing the broom head from the sheath or boot of the corn.

Figure 9 is a view, in section, showing a stalk cutter intended to be used instead of the bumper, shown in Figure 6, and which incorporates cutter means for severing the stalks into short lengths. This can be used when stalks are unusually tough, so that the attachment is unable to pull the broom head directly from the boot.

Figure 7:
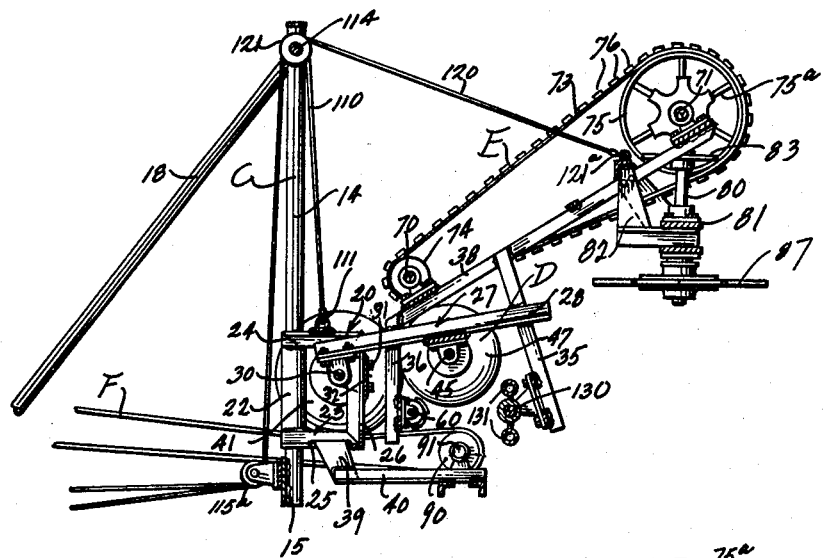
Figure 7 is a cross sectional view taken substantially on the line 7—7 of Figure 2, showing more particularly adjustment details of the attachment.

In the drawings, wherein for the purpose of illustration is shown a preferred embodiment of the invention, the letter A may generally designate the improved broom corn harvester or picker, adapted to be mounted upon a tractor B. The harvester attachment A may include a frame C and mounted thereon the frame head picker assemblage D and means E for guiding and manipulating the broom corn stalk and head initially so that the broom head will be properly presented to the picker assemblage D. Conveyor belts F are provided to receive the broom heads for transmittal to the rear of the tractor into a trailer or other storage or receiving device G.

The tractor B may be of usual commercial type, including a chassis frame 10 having running gear 11 connected therewith and including a power take-off 12 having a pulley wheel.

The frame construction C preferably includes a pair of vertical standards 13 and 14 welded at their lower ends to a cross plate 15; the latter being detachably connected by bolt means 16 across the front of the tractor frame 10, in the relation of parts shown in Figures 1 and 3. The upper ends of the standards 13 and 14 may be connected by a cross brace 17, shown in Figure 3. To the upper ends of the vertical standards 13 and 14 are connected rearwardly extending diagonal brace rods 18 which at their lower heads are connected at 19 to the tractor chassis frame 10, as shown in Figures 1 and 2 of the drawings. These standards and brace rods furnish the rigid part which is connected to the tractor, and any other suitable bracing may be provided to stabilize the position of the vertical standards.

The broom head picker assemblage D preferably includes a frame 20. It includes sleeves 22 slidably telescoped upon the vertical standards 13 and 14 for a purpose to be subsequently described. These sleeves 22 have attached thereto a rectangular frame assemblage 23, best shown in Figure 7, the horizontal components 24 and 25 of which are welded at their rear ends to each of the sleeves 22. They extend forwardly to support a vertical component 26 welded or otherwise secured thereto. The frame structure 20 also includes a hinged frame 27, comprising a pair of main members 28, the rear ends of which are pivotally connected upon a shaft 30. The latter is rotatably supported by bracket portions detachably mounted at 31 upon a cross plate 32 which is welded or otherwise secured to the vertical struts 26. It is thus seen that the frame 27 hinges upon the shaft 30 for movement in a vertical plane.

The frame structure 27 of the picker assemblage furthermore includes front and rear upright frame pieces 35 and 36 respectively, welded to each of the members 28, as shown in Figure 7. The upper ends of the frame pieces 35 and 36 have welded thereto diagonal frame pieces 38 in the relationship shown in Figures 2 and 7.

The frame 20 furthermore includes laterally extending frame pieces 39, welded to the bottom rail portions 25, as shown in Figure 7, and having welded at their outer ends forwardly extending belt supporting rails or bars 40 at each side of the machine.

Further referring to the broom head picker assemblage D, the shaft 30 at its outer ends is provided with friction type pneumatic wheels or rollers 41 keyed for rotation with the shaft 30. The rail pieces 28 of the hinged frame 27 rotatably support a shaft 45 thereupon in parallelism with the shaft 30, and which shaft 45 has keyed thereto a pair of friction type pneumatic rollers or wheels 47, one at each side of the machine, and in position to peripherally contact the periphery of the respective wheels or rollers 41, as shown in Figure 1. The broom heads are adapted to be caught between the engaging surfaces of these rollers, after the heads have been bent and guided by the means E to the position shown in Figure 8. It will be noted from Figure 4 that the pneumatic wheels are generally flat, transversely thereof, entirely around the wheels to provide broad flat surfacing in order to function properly in gripping the entire broom head.

The broom head picker assemblage D furthermore includes a shaft 60 rotatably supported upon suitable brackets attached to the struts 36 of the hinged frame. This shaft 60 is provided with certain hubs upon which resilient and flexible flaps 62 are connected (see Figure 7); the shaft 60 being so positioned that its flapper arrangement is located directly below the line contact of each pair of rollers or wheels 41 and 47, for the purpose of directing the broom heads to the conveyors F.

Figure 8:
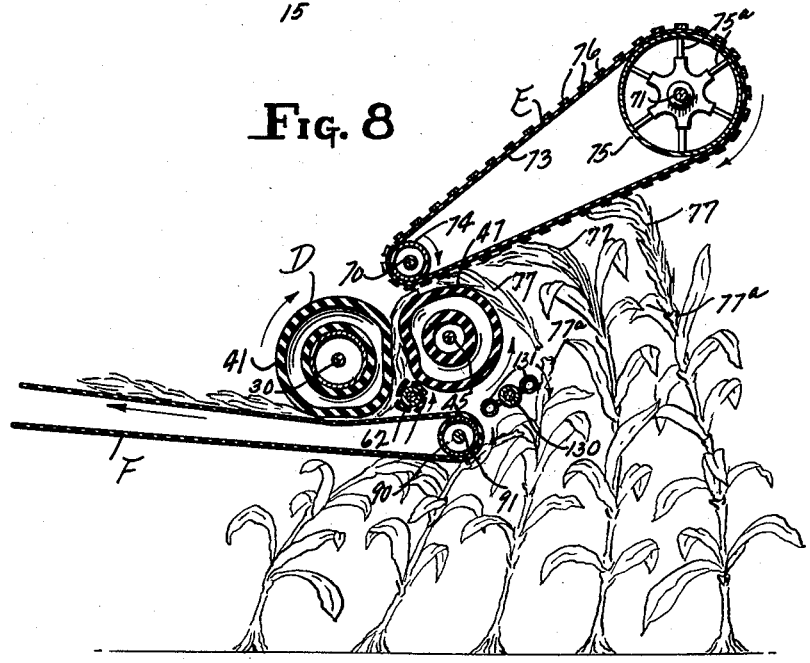
Figure 8 is a cross sectional view taken substantially on the line 8—8 of Figure 2 and more particularly showing the manner in which the broom corn head is guided into the picking parts of the attachment.

Referring to the stalk and head control means E, the same includes a lower-rear shaft 70 and an upper forward shaft 71. They are rotatably mounted upon suitable bearings or brackets supported by the beams 38, in the relationship shown in Figure 7. On each side of the machine is rotatably supported an endless belt 73 carried upon suitable wheels 74 and 75 carried by shafts 70 and 71; this belt 73 preferably having cleats 76 or some other means thereon for engaging and holding the broom corn heads, designated at 77 in Figure 8 of the drawings, and moving them to the rear for disposition onto the periphery of the roller 47 and ultimately between the rollers 41 and 47, as shown in Figure 8.

Means is provided to straighten the rows of broom corn being harvested, in order that their heads 77 will engage beneath the endless belt 73 and be moved to the rear as the machine advances. This comprises shafts 80, two upon each side of the frame of the attachment located at each side of each belt 73. They are vertically positioned and supported in bearings 81 carried by brackets 82 which are attached to the beams 38, as shown in Figure 7. The upper ends of these shafts 80 are provided with wheels 83 the spokes or teeth of which mesh with the spokes 75$^a$ of the belt wheels 75, in order to insure continuous rotation of the shafts 80. The lower ends of the shafts 80 are provided with stalk and broom corn straightening wheels 87, having laterally extending spokes which are adapted to engage the broom corn and direct it into position beneath the belts 73 from each side of each belt.

The conveyors F are of the broad belt type, trained over belt wheels 90 rotatably supported on a shaft 91 carried by the frame extensions 40, at each side of the machine. The conveyors F extend rearwardly and are trained at their rear ends over belt wheels or rollers 93 mounted upon the shaft 92. The latter is rotatably supported in suitable bearings 92$^a$, shown in Figure 2, and located upon a frame structure 94 which is adjustably attached to the chassis 10. The frame structure 94 preferably includes an upwardly extending arm 95 adjustably connected at 96 to a suitable chassis frame bracket 97$^a$. It has frame beams 97 extending rearwardly and which support the bearings 92$^a$. They are braced by diagonal bracing 98. Frames 94 may be adjusted at the connections of the frame pieces upon the chassis frame so that the rollers 93 may have a narrow range of adjustment fore and aft to suit the desired adjusted position of the corn head picker assemblage D and to compensate for elevation and lowering of the assemblage D. The belt type conveyors may have sufficient play in them in lieu of adjusting the frame 94 to compensate for this. The conveyors F are placed at each side of the tractor, as shown in the plan view of Figure 2, and their rear ends are positioned over the chamber of the trailer G. The latter is adapted to be connected as at 100 to the tractor, for receiving therein the broom heads from the conveyors F.

Referring to the means for vertically adjusting the broom head picker details to suit the height of the plants, it is preferred to provide an elevating means which is shown as a winch and cable arrangement in the drawings. The latter includes flexible cables 110, attached at 111, at their forward lower ends, to the top rails 24 of the frame 20; these cables being trained over sheaths or pulleys 112 rotatably mounted adjacent to the tops of the standards 13 and 14, upon a cross shaft 114 thereon (see Fig. 3). The cables 110 extend downwardly at the rear of the standards and are trained over pulleys 115 secured upon the cross plate 15 of the standards; the cables 110 then extending rearwardly and being trained over suitable drums 125 with a winch arrangement which may be connected to the chassis frame 10 and which includes a shaft 126 having the cable drums 125 keyed therewith and a crank shaft 127 for manual manipulation. It is perfectly apparent from the foregoing that through manipulation of this winch mechanism the entire broom head picker assemblage D may be elevated and lowered to suit the height of the broom corn being harvested.

Means is also provided for elevating and lowering the stalk and head guide and control devices E. This consists of a pair of side cables 120 connected at 121$^a$ to the frame 82 at the outer end of the guide and control means E, the cables extending rearwardly and being trained over suitable pulleys 121 which are placed upon the shaft 114, and thence extended downwardly and are trained upon pulleys 115$^a$, connected upon the shaft upon which the pulleys 115 are connected. The cables 120 extend to the rear, as shown in Figure 2 of the drawings and their rear ends are controlled by a winch mechanism 116 including drums which are keyed upon a cross shaft 117 controlled by a pawl and ratchet type winch including a crank handle 118.

It is apparent from the foregoing that the entire frame structure 27 including the rollers 41 and 47 and the direction positioning belts 73 may be swivelled or hinged upon the shaft 30, through manipulation of the cables 110 and 120 upon the winch mechanism in order to conform to the height of the broom corn being harvested.

As an aid to proper separation of the broom head from the stalk and boot of the broom corn, bumper or knocker assemblages are provided, including a rotatable shaft 130 rotatably supported upon brackets 131$^a$ connected to the frame members 35. This shaft 130, beneath each of the belts 73, is provided with bumper bars 131 connected to and radially spaced with respect to the hubs keyed upon the shaft 130. It can readily be seen that during rotation of the shaft 130, the bumper bars 131 will exert a quick knocking or bumping action against the stalk of the broom corn, just below the boot, designated at 77$^a$ in Figure 8 of the drawings, for the purpose of enabling the anti-friction picker rollers to pull the broom heads 77 free of the boots or sheaths and deposit them upon the conveyor F for travel to the trailer G.

Any approved system of drive belting may be provided, but as shown in the drawings, the frame 94 rotatably supports a shaft 140 upon which a pulley 141 (Fig. 2) is keyed; this pulley 141 being connected by suitable belt 142 with the power take-off 12 for rotation of the shaft 140. The shaft 140, as shown in Figure 2 of the drawings, is provided with another pulley 144, having a crossed belt 145 trained thereover and reefed over a pulley 146 which is keyed to the conveyor shaft 92. The direction of rotation of this belting and the pulleys is indicated in Figure 1 and elsewhere. The direction of travel of the upper treads of the conveyors F is to the rear. The pneumatic wheels 41 bear against the upper treads of the conveyor belts, slightly depressing them, as shown in Figure 1. The shaft 30 upon which the roller wheels 41 are keyed has a pulley 150 keyed thereon (see Fig. 2) and belt 151 is trained over this pulley and extends to the rear and is trained over a pulley 152 keyed to the shaft 140, for driving the wheels 41. The endless belts 73 are driven by means of a belt 160 which is trained over a pulley 161 keyed on the shaft 30, and also trained upon a pulley 162 keyed on the shaft 60.

The pneumatic wheels 47 have drive contact with the wheels 41. The shaft 45 is provided with a pulley 165 thereon having a belt 166 trained thereover and connected with a suitable pulley which is attached to the shaft 60 of the flapper means 62.

The bumper bar assemblage shaft 130 is rotated by means of a belt 132 trained over a pulley 170 keyed upon the shaft 30, as shown in Figure 2.

The operation of the harvester will be apparent from the foregoing. After the operator has elevated the picking rollers and the corn bending belts 73 to the proper degree, through manipulation of the cables 110 and 120, the power take-off is put into action for rotating the sets of wheels 41 and 47 and the endless corn bending belts 73, and as the tractor travels between rows of broom corn, which ordinarily are spaced about thirty inches apart, the broom corn will be manipulated accurately so that the heads 77 will enter between the sets of pneumatic rollers 41 and 47 on each side of the machine, for the purpose of conveying the heads to the trailer G. In this connection it has been mentioned that the bumper rods or members 131 will knock the stalk sharply just below the boot or at the boot for permitting severance of the head free from the sheath or boot. The wheels 41 and 47 are disposed in the same vertical plane on parallel axes. The corn head above the boot is guided around the peripheries of the wheels with the axes of the stalks and heads lying in the same plane as the plane of the wheels 41 and 47. Thus, the pull upon the head above the boot is entirely peripherally about the wheels much the same as in hand pulling.

Under some circumstances it may be necessary to use stalk cutter bars on shaft 130, as shown at 131ª in Figure 9, which may have sharp edges or blades thereon if desired, for cutting stalks of the corn to shorter lengths. This is optional and may be used when the stalks are unusually tough and difficult to break the broom head free from the sheath.

Various changes in the shape, size and arrangement of parts may be made to the form of invention herein shown and described, without departing from the spirit of the invention or scope of the claims.

I claim:

1. In an attachment for broom corn harvesting machines the combination of a harvesting machine attaching frame, a broom head picker assemblage mounted for upright adjustment upon the frame including means to permit said adjustment, said picker assemblage comprising a pair of peripherally facing pneumatic wheels disposed in the same vertical plane, a rotary flapper assemblage carried by the frame at the locus of said peripheral facing for engaging the broom heads as they are moved from between said wheels, and an endless belt rotatably supported by said frame for bending broom heads into gripping position between said wheels.

2. In a broom head picker assemblage for broom corn harvesting machines, the combination of a frame, a pair of peripherally facing pneumatic wheels rotatably mounted upon the frame on parallel axes for receiving broom heads between the peripheries, means carried by the frame for guiding broom heads from a row of corn above the boot into position between said pneumatic wheels, and bumper means carried by the frame forwardly of the wheels for sharply knocking the corn stalk adjacent to the boot thereof to facilitate severage of the broom head from the boot as the broom head is pulled between said wheels.

3. In a broom corn picking assemblage for broom corn harvesting machines, the combination of a supporting frame, a pair of rotatable broom head picking wheels carried by the frame having means for relative rotation thereof for the purpose of engaging broom heads between the peripheries thereof for the picking thereof from the stalks, a conveyor carried by the frame for receiving the broom heads after being freed from said wheels, means carried by the frame to guide the broom heads onto said conveyor as the broom heads are released from between the wheels, and bumper means carried by the frame in advance of the foremost of said rollers for sharply knocking stalks of broom corn below the boot in order to separate the broom head from its boot when the broom head is engaged between said wheels.

4. A broom corn harvesting assemblage as defined in claim 3 in which means is carried by the frame for bending the broom heads of the corn from the top thereof in advance of the rollers into position between the rollers, and means carried by the frame for side straightening of the broom heads with respect to said bending means prior to engagement of the heads between said rollers.

5. In a broom corn harvester, a vehicle having a frame structure supported thereon, a conveyor mounted upon the frame having means for driving the same, means carried by the frame of the vehicle for gripping broom heads of broom corn above the boots for pulling the same from the stalks positioned upon the frame to deposit the severed broom heads upon said conveyor, means carried by the frame above and in advance of the picking means for bending the broom heads of the corn from the tops thereof downwardly and to the rear for engagement by said picking means, and a rotatably driven bumper supported by said frame in advance of the picking means and in position to hit the stalk of corn below its boot to sever the same after the broom head has been bent by said bending means into position to be engaged by said picking means.

6. In a broom corn harvesting machine, the combination of a vehicle having a supporting frame, a pair of pneumatic wheels rotatably carried by the frame disposed in the same vertical plane with one wheel rearwardly of the other, rotatable guide means carried by the frame, in position for moving the broom heads in the direction of travel of the vehicle and onto the peripheries of and between the wheels for severance from their boots, power means to drive said wheels and guide means, and stalk knocking means carried by the frame for striking the stalks of the broom corn below the boots as the vehicle advances and the heads are moved by said guide means in order to assist in severing the boots and heads from the stalks as the wheels pull upon the heads.

References Cited in the file of this patent
UNITED STATES PATENTS

| | | |
|---|---|---|
| 1,912,538 | Morton | June 6, 1933 |
| 2,163,849 | Pfister | June 27, 1939 |
| 2,521,999 | Scott | Sept. 12, 1950 |
| 2,599,143 | Thompson | June 3, 1952 |
| 2,660,013 | Priestley | Nov. 24, 1953 |